United States Patent
Nitschke et al.

(10) Patent No.: US 6,295,494 B1
(45) Date of Patent: Sep. 25, 2001

(54) DATA TRANSFER METHOD IN A RESTRAINT SYSTEM CONNECTED TO A BUS LINE

(75) Inventors: Werner Nitschke, Ditzingen; Otto Karl, Leonberg; Joachim Bauer, Oberstenfeld-Prevorst; Michael Bischoff, Adelschlag; Günter Fendt, Schrobenhausen; Johannes Rinkens, Ingolstadt; Stefan Schaffer, Schrobenhausen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,297
(22) PCT Filed: Mar. 26, 1999
(86) PCT No.: PCT/DE99/00937
§ 371 Date: Feb. 2, 2001
§ 102(e) Date: Feb. 2, 2001
(87) PCT Pub. No.: WO99/50095
PCT Pub. Date: Oct. 7, 1999

(30) Foreign Application Priority Data

Mar. 28, 1998 (DE) ................................. 198 13 962

(51) Int. Cl.$^7$ ........................... B60R 21/00; B60R 22/00; G06F 3/00; G06F 9/00; G06F 17/00; G06F 19/00
(52) U.S. Cl. ................................. 701/45; 701/46; 701/47; 180/98; 180/232; 180/292; 280/728; 280/734; 280/735; 280/730.1; 280/730.2; 343/7 VM; 343/7 ED; 343/9; 343/112 CA; 343/5 PD; 375/295; 375/296; 375/376
(58) Field of Search .................. 701/45, 46, 47; 343/7 VM, 9, 7 ED, 112 CA, 5 PD; 180/98, 292, 232; 342/165, 171, 173, 174, 175; 375/295, 376, 296; 340/436, 903, 429, 665, 669; 332/118, 126; 702/183, 189, 190; 366/424.055, 424.056, 424.057; 280/728, 734, 735, 730.1, 730.2

(56) References Cited

U.S. PATENT DOCUMENTS

| | | | |
|---|---|---|---|
| 3,760,415 | * | 9/1973 | Holmstrom et al. ............... 342/7 ED |
| 4,143,370 | * | 3/1979 | Yamanaka et al. ............... 343/7 VM |
| 5,216,607 | * | 6/1993 | Diller et al. ..................... 364/424.05 |
| 5,309,436 | | 5/1994 | Hirano et al. ..................... 370/85.1 |
| 5,620,202 | * | 4/1997 | Gray et al. ............................ 280/735 |
| 5,668,723 | * | 9/1997 | Blackburn ............................ 701/45 |
| 5,801,619 | * | 9/1998 | Liu et al. ............................. 340/436 |
| 5,839,096 | * | 11/1998 | Lyons et al. ........................ 702/182 |
| 5,867,536 | * | 1/1999 | Lyons et al. ........................ 375/295 |
| 6,188,314 | * | 2/2001 | Wallace et al. ..................... 340/438 |

OTHER PUBLICATIONS

Bauer et al., Bussystem zur Vernetzung von Aktuatoren für Rückhaltesysteme (Bus System for the Connection of Actuators for Restraint Systems), Conference Proceedings of the SAE International Congress & Exposition, Feb. 24–27, 1997, Detroit. Described in the specification.

* cited by examiner

Primary Examiner—William A. Cuchlinski, Jr.
Assistant Examiner—Ronnie Mancho
(74) Attorney, Agent, or Firm—Kenyon & Kenyon

(57) ABSTRACT

In the restraint system, in which coupled to a bus line are a central control unit and a plurality of data processing units that are provided to trigger restraint devices, a plurality of data channels that are clearly separable from each other are to be transmittable. In this context, data of high priority and high time-related urgency are transmitted with a high signal level and a high bit rate, data of lower priority and lower time-related urgency are transmitted with a low signal level and a low bit rate, data of high priority and lower time-related urgency are transmitted with a high signal level and a low bit rate, and data of a lower priority and high time-related urgency are transmitted with a low signal level and a high bit rate.

6 Claims, 2 Drawing Sheets

DATA TRANSFER METHOD IN A RESTRAINT SYSTEM CONNECTED TO A BUS LINE

FIELD OF THE INVENTION

The present invention relates to a method for data transmission in a vehicle-occupant restraint system connected through a bus line, coupled to the bus line being a central control unit and a plurality of data processing units that are provided for the triggering of restraint devices at various locations in the vehicle, data of high priority and high time-related urgency being transmitted with a high signal level and high bit rate, and data of lower priority and lower time-related urgency being transmitted at a low signal level and low bit rate.

BACKGROUND OF THE INVENTION

The performance capability of the restraint systems in vehicles will sharply increase in the future in order to further improve the protection of vehicle occupants. That means that the number of restraint devices and their accompanying triggering devices in the vehicle will drastically increase. Among these restraining devices are, for example, multi-stage-activation air bags for driver and front-seat passenger, knee bags for driver and front-seat passenger, side air bags for driver, front seat passenger and backseat passengers, whereby side air bags can be provided for the head as well as the thoracic region, seat belt tighteners, which can also be activated in multiple stages, possibly also a rollbar, etc. Thus, a complex protection system that includes a plurality of restraining devices is installed for each vehicle occupant. A complex restraint system is described in the German Published Patent Application 1 961 293 and in the Conference Proceedings of the SAE International Congress & Exposition, 2/24-2711997, Detroit, in the article "Bussystem zur Vernetzung von Aktuatoren für Rückhaltesysteme" (Bus System For The Connection Of Actuators For Restraint Systems) by J. Bauer, G. Mehler and W. Nitschke. By introducing a bus system that connects all restraining devices to each other, voluminous wiring harnesses can be spared. Provided in this system for each restraining device is a data processing unit, which has essentially a computing unit, data input and output circuits, a memory unit, a time and clock base and a power supply. Also characterized as a peripheral intelligent activation end stage, this data processing unit is arranged in the direct vicinity of the triggering devices belonging to the particular restraint unit, namely in a squib insert or a substrate of the squib itself.

A central control unit connected to the bus line uses a plurality of control signals—e.g. of acceleration sensors, pre-crash sensors and seat occupancy sensors—to determine which of the restraint devices present are to be triggered. If these sensors signal a crash, then the central control unit sends a triggering command through the bus line to all or selected data processing units. Here, the central control unit uses a protocol transmitted through the bus line to address those data processing units for which the triggering command is determined. Also diagnostic commands are output from the central control unit through the bus line to the individual data processing units, which, in turn, send their diagnostic responses back to the central control unit through the bus. The transmitted data are assigned to two different categories. Triggering signals belong to the signal category with highest priority here, i.e. triggering signals require a very high transmission security and have a very high time-related urgency. By contrast, diagnostic queries and diagnostic responses belong to a signal category with lower priority because these do not require a very high transmission security or a very high time-related urgency. According to the related art mentioned here, to distinguish between signals of differing priority, signals with higher priority and higher time-related urgency (triggering signals) are transmitted with a high signal level and a high bit rate and signals with lower priority and lower time-related urgency (diagnostic queries, diagnostic responses) are transmitted with a lower signal level and a lower bit rate. With this type of signal configuration, it is possible to provide two different signal channels that can be separated from one another with a high degree of reliability.

The underlying object of the present invention is to specify a method with which more than two signal channels that are clearly separable from each other can be realized.

SUMMARY OF THE INVENTION

The cited object of the present invention is accomplished in that, in addition to data having a high priority and high time-related urgency and data having a lower priority and lower time-related urgency, also data having a high priority and lower time-related urgency are transmitted with a high signal level and a low bit rate, and data having a lower priority and high time-related urgency are transmitted with a low signal level and a high bit rate.

The triggering commands sent out from the central control unit to one or more data processing units can be treated as data having a high priority and high time-related urgency. Diagnostic queries sent out from the central control unit to data processing units and diagnostic responses sent back in the reverse direction are treated as data having lower priority and lower time-related urgency. Data sent out from the central control unit to data processing units to program address buffers in the data processing units are treated as data having a high priority and lower time-related urgency and, for example, sensor signals that are transmitted between the central control unit and data processing units are treated as data having lower priority and high time-related urgency.

Using a total of four differentiation criteria—namely two different signal levels and two different bit rates—it is possible to realize four data channels that can be effectively separated from each other.

DETAILED DESCRIPTION

Figure 1:
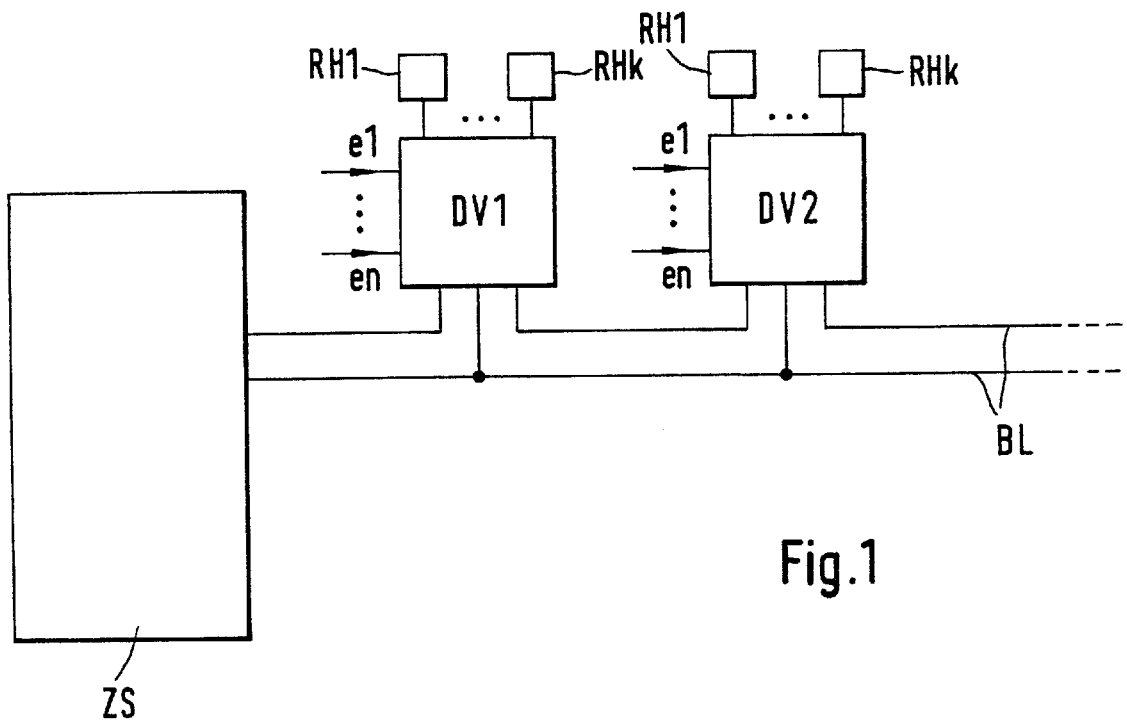
FIG. 1 shows a block diagram of a restraint system.

The restraint system depicted in FIG. 1 includes a central control unit ZS, to which a plurality of data processing units DV1 and DV2 are coupled by way of a bus line BL. Each of these two data processing units DV1 and DV2, depicted here in the drawing for purposes of example, is used to activate one or more restraint devices RH1, . . . , RHk. As already detailed in the introduction, one or more multiple-stage-activation driver and front-seat-passenger air bags, side air bags, seat belt tighteners, etc. can be included in these restraint devices RH1, . . . , RHk. According to the exemplary embodiment in FIG. 1, data processing units DV1 and DV2 have, in addition to the inputs for bus line BL, additional inputs e1, . . . , en through which data processing units DV1 and DV2 can be supplied with, for example, sensor inputs of acceleration sensors, pre-crash sensors or seat occupancy sensors.

In FIG. 1, a section of a bus line BL is depicted in the form of a branch line. However, bus line BL can also be configured as a ring circuit.

Different types of data are transmitted over bus line BL between central control unit ZS and individual data processing units DV1 and DV2. These can be data of various priorities and various time-related urgencies.

Triggering signals have the highest priority of all transmitted data, and they are also of the highest time-related urgency compared to all other data. Therefore, triggering signals are transmitted with a high signal level and a high bit rate.

Data that the central control unit sends out over bus line BL, for example, to program the addresses in data processing units DV1 and DV2, also have a high priority. However, their time-related urgency is not as high as that of triggering signals.

There are also data that have a lower priority but are of a high time-related urgency. Included in this category are, for example, data of seat occupancy sensors or other outlying sensors. These sensor signals are then assessed in central control unit ZS or in data processing units DV1 and DV2 for the selection of restraint devices to be triggered RH1, . . . , RHk and the determination of the triggering times.

A fourth category of data are those with lower priority and lower time-related urgency. Included here are diagnostic query signals that are sent out from central control unit ZS to individual data processing units DV1 and DV2, so that the data processing units can check the operational capability of the ignition devices of restraint devices RH1, . . . , RHk connected to them. The diagnostic responses that data processing units DV1 and DV2 send back to central control unit ZS are also included in this category.

Figure 2:
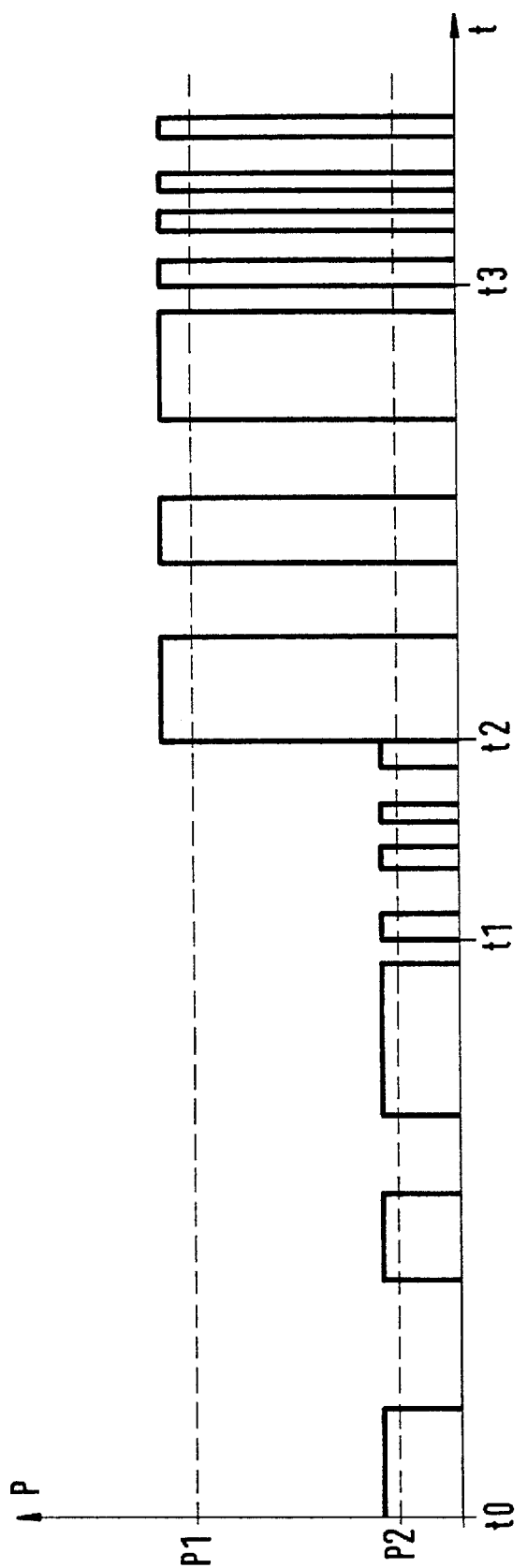
FIG. 2 shows a signal curve of four data channels having different priorities and time-related urgencies.

In FIG. 2, examples of signals from all four categories are depicted in a time-related signal curve, the signals being either current or voltage signals having the level P. In time range t0 to t1, data having low priority and lower time-related urgency are transmitted with a low level and a low bit rate. In the next time range t1 to t2 are depicted data having lower priority but higher time-related urgency; these data are transmitted with a low signal level but a higher bit rate. In the time range t2 to t3 are data having a high priority and a low time-related urgency, which are transmitted with a high signal level but a low bit rate. In the time range from t3 and above are depicted data having a high priority and a high time-related urgency, which are transmitted with a high signal level and a high bit rate.

In order to be able to separate the four indicated signal channels from each other, there is in data processing units DV1 and DV2 and in central control unit ZS a comparator circuit that detects whether a signal level exceeds upper level threshold P1 or whether a signal level goes over a lower level threshold P2 but not upper level threshold P1. Those data whose level exceeds upper level threshold P1 are data of a high priority, and those data that exceed only lower level threshold P2 are of a lower priority. Furthermore, in central control unit ZS and in data processing units DV1 and DV2, there is circuitry that is capable of separating signals of a high bit rate from signals of a low bit rate.

Figure 3:
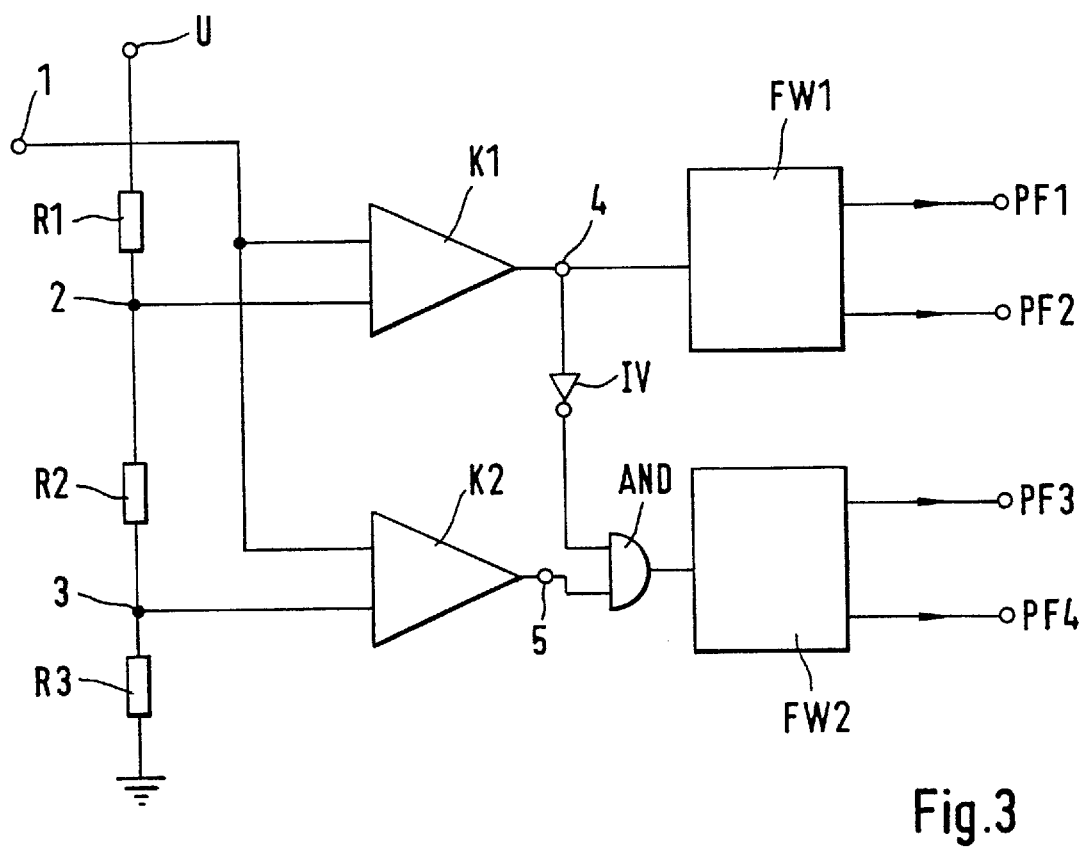
FIG. 3 shows a circuit for the separation of four data channels.

An exemplary embodiment for a circuit that is capable of separating from each other all four of the data channels mentioned is depicted in FIG. 3. The circuit has two comparators K1 and K2, of which in each case one input is connected to a connection point 1 at which the data to be separated are found. Second input 2 of comparator K1 and second input 3 of comparator K2 each receive a reference voltage that is derived from a voltage U via a voltage divider R1, R2, R3. Voltage U and voltage divider R1, R2 R3 are of such a magnitude that at input 2 of first comparator K1, a reference voltage is applied that corresponds to level threshold P1, and that the reference voltage applied at input 3 of second comparator K2 corresponds to level threshold P2. Thus, all data of high priority that exceed upper level threshold P1 appear at output 4 of first comparator K1, and all data that exceed level threshold P2 appear at output 5 of second comparator K2. Since the high priority signals naturally exceed not just upper level threshold P1, but also lower level threshold P2, only those data that exceed lower level threshold P2 but not upper level threshold P1 should be selected as data of lower priority. Provided for that purpose are an inverter IV for the output data of comparator K1 and an AND gate, which at its output only then allows output data of comparator K2 to appear when the input data at port 1, besides exceeding low level threshold P2, do not exceed high level threshold P1 as well.

A first frequency-dividing network FW1 is connected to output 4 of first comparator K1, and a second frequency-dividing network FW2 is connected to the output of the AND gate. First frequency-dividing network FW1 divides data having high signal levels into data having a high bit rate PF1 and data having a low bit rate PF2. Second frequency-dividing network FW2 separates data having low signal levels into data having a high bit rate PF3 and data having a lower bit rate PF4. In this way, each data signal present at input 1 can be assigned to one of the four signal channels PF1, PF2, PF3 or PF4. Frequency-dividing networks FW1 and FW2 include, e.g., counters with which the bit rates of the incoming data can be determined, and comparators which distinguish a higher bit rate from a lower bit rate.

The signal curve in FIG. 2 and the circuit in FIG. 3 for the separation of the data signals show an exemplary embodiment in which only two stages of priority (signal levels) are differentiated. However, a differentiated classification of the priorities of the individual data signals in which a plurality of signal levels are specified would also be possible.

What is claimed is:

1. A method for performing a data transmission in a vehicle-occupant restraint system connected through a bus line, a central control unit and a plurality of data processing units being coupled to the bus line, the central control unit and the plurality of data processing units triggering restraint devices at locations in a vehicle, the method comprising the steps of:

transmitting data of a high priority and a high time-related urgency with a high signal level and a high bit rate;

transmitting data of a lower priority and a lower time-related urgency with a low signal level and a low bit rate;

transmitting data of the high priority and the lower time-related urgency with the high signal level and the low bit rate; and transmitting data of the lower priority and the high time-related urgency with the low signal level and the high bit rate.

2. The method according to claim 1, further comprising the step of:

sending out from the central control unit triggering commands to at least one of the plurality of data processing units, the triggering commands corresponding to the data of the high priority and the high time-related urgency.

3. The method according to claim 1, further comprising the steps of:

sending out in a first direction from the central control unit diagnostic queries to the plurality of data processing units; and sending back diagnostic responses in a second direction that is opposite to the first direction, the diagnostic queries and the diagnostic responses corresponding to the data of the lower priority and the lower time-related urgency.

4. The method according to claim 1, further comprising the step of:

sending out from the central control unit to the plurality of data processing units data for a programming of address buffers in the plurality of data processing units, the data sent out for the programming of the address buffers corresponding to the data having the high priority and the lower time-related urgency.

5. The method according to claim 1, further comprising the step of:

transmitting sensor signals between the central control unit and the plurality of data processing units, the sensor signals corresponding to the data of the lower priority and the high time-related urgency.

6. The method according to claim 5, wherein:

the sensor signals correspond to seat occupancy sensor signals.

* * * * *